United States Patent
Liu (10) Patent No.: US 6,782,198 B1
(45) Date of Patent: Aug. 24, 2004

(54) SWITCHING ARRANGEMENT FOR FAULT RECOVERY IN OPTICAL WDM RING NETWORKS

(75) Inventor: Gang Liu, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 534 days.

(21) Appl. No.: 09/710,269

(22) Filed: Nov. 10, 2000

(51) Int. Cl.[7] .............................................. H04B 10/08
(52) U.S. Cl. ................................. 398/3; 398/4; 398/5
(58) Field of Search ............................. 398/3, 4, 5, 14; 370/222, 223; 359/337.12; 372/38.09

(56) References Cited

U.S. PATENT DOCUMENTS

| | | | | |
|---|---|---|---|---|
| 4,501,021 A | * | 2/1985 | Weiss ............................. | 398/4 |
| 5,625,478 A | * | 4/1997 | Doerr et al. .................... | 398/4 |
| 5,680,235 A | * | 10/1997 | Johansson ....................... | 398/7 |
| 5,751,454 A | * | 5/1998 | MacDonald et al. ........... | 398/59 |
| 5,903,367 A | * | 5/1999 | Moore ............................. | 398/5 |
| 5,903,370 A | * | 5/1999 | Johnson .......................... | 398/4 |
| 5,933,258 A | * | 8/1999 | Flanagan et al. ............... | 398/5 |
| 6,115,154 A | * | 9/2000 | Antoniades et al. ........... | 398/4 |
| 6,222,653 B1 | * | 4/2001 | Asahi ............................. | 398/4 |

* cited by examiner

*Primary Examiner*—Jason Chan
*Assistant Examiner*—David C. Payne (57) ABSTRACT

Recovery from link failure in a WDM ring network is implemented by forming an active ring and a protection ring through the same nodes. Failure in any wavelength channel of a link causes a node adjacent to the link to reroute any subsequent incoming signal from the source node and on the active ring to the protection ring and in an opposite direction. The oppositely directed signal is rerouted again at the other adjacent node back to the active ring to arrive at the destination node. The physical ring serving as the active ring to odd wavelength channels serves as the protection ring to even wavelength channels, and vice versa.

3 Claims, 11 Drawing Sheets

SWITCHING ARRANGEMENT FOR FAULT RECOVERY IN OPTICAL WDM RING NETWORKS

FIELD OF THE INVENTION

The present invention relates to optical ring networks, and more particularly, to fault recovery systems in optical wavelength division multiplexing ring networks.

BACKGROUND OF THE INVENTION

A typical ring network includes nodes, each node having a unique address. A demand will request that specific information be transmitted from a sending node to a receiving node. Traffic between different sending node/receiving node pairs is assigned to different wavelength channels, each of which may be considered either even or odd.

Adjacent nodes are interconnected by at least two fiber links, one being a clockwise-directed fiber for transmittal of even channels, and a second being a counterclockwise-directed fiber for transmittal of odd channels. The clockwise-directed fibers and the nodes between them constitute a clockwise-directed ring, and the counterclockwise-directed fibers and the nodes between them constitute a counterclockwise-directed ring.

For wavelength division multiplexing ring networks, each node has the apparatus for being a sending node and for being a receiving node. For this purpose, each node typically includes a frequency multiplexer and demultiplexer. The multiplexer is responsive to the demand so that if that node is the sending node specified in the demand, the information will be encoded, wavelength multiplexed to the appropriate channel, and added to the data stream arriving at that node. The demultiplexer is responsive to the data stream arriving at the node, so that it decodes each signal, determines if that node is the destination node and if so, drops the signal.

Occasionally, a link fails for one or more wavelength channels. In conventional systems for network recovery, the link failure is broadcast to each node. A switch on each node then reassigns signals from inoperative to operative wavelength channels. Such a system is expensive and cumbersome because of the broadcasting of link failure to each node and because each node must include a switch for each channel.

SUMMARY OF THE INVENTION

A network according to the principles of the invention includes a link failure detector and a failure correction apparatus. The link failure detector is in at least one of the links for detecting whether transmission of a signal intended for transmission between the pair of adjacent nodes which the link is between was successful or unsuccessful. The link failure detector also produces a link transmission signal indicative of success or lack of success. The link transmission signal is intended for transmission to the pair of nodes adjacent to the link.

The failure correction apparatus is in each node adjacent to a link having the link failure detector. The failure correction apparatus is responsive to the link transmission signal produced by the failure correction apparatus, so that in response to a link transmission signal indicative of unsuccessful transmission, any signal in either network arriving subsequently at the node is diverted to the other network, and so that in response to a link transmission signal indicative of successful transmission, any signal in either network arriving subsequently at the node is permitted to continue in the same network in which it arrived. Any signal subsequently produced at the node for transmission into either network is treated by the fault correction apparatus as a signal in the same network arriving subsequently at the node.

Such a system successfully diverts signals around any break in the network, and avoids the broadcasting of link failure to each node since only adjacent nodes are affected. Thus, it is simpler and less costly. Furthermore, each node need not include a switch for each channel. A fault correction apparatus on the node switches all nodes from one network to the other, regardless of which channels failed.

BRIEF DESCRIPTION OF THE DRAWINGS

The exemplary embodiments will be described with reference to the drawings, in which like elements have been denoted throughout by like reference numerals, and wherein.

DETAILED DESCRIPTION

Figure 1:
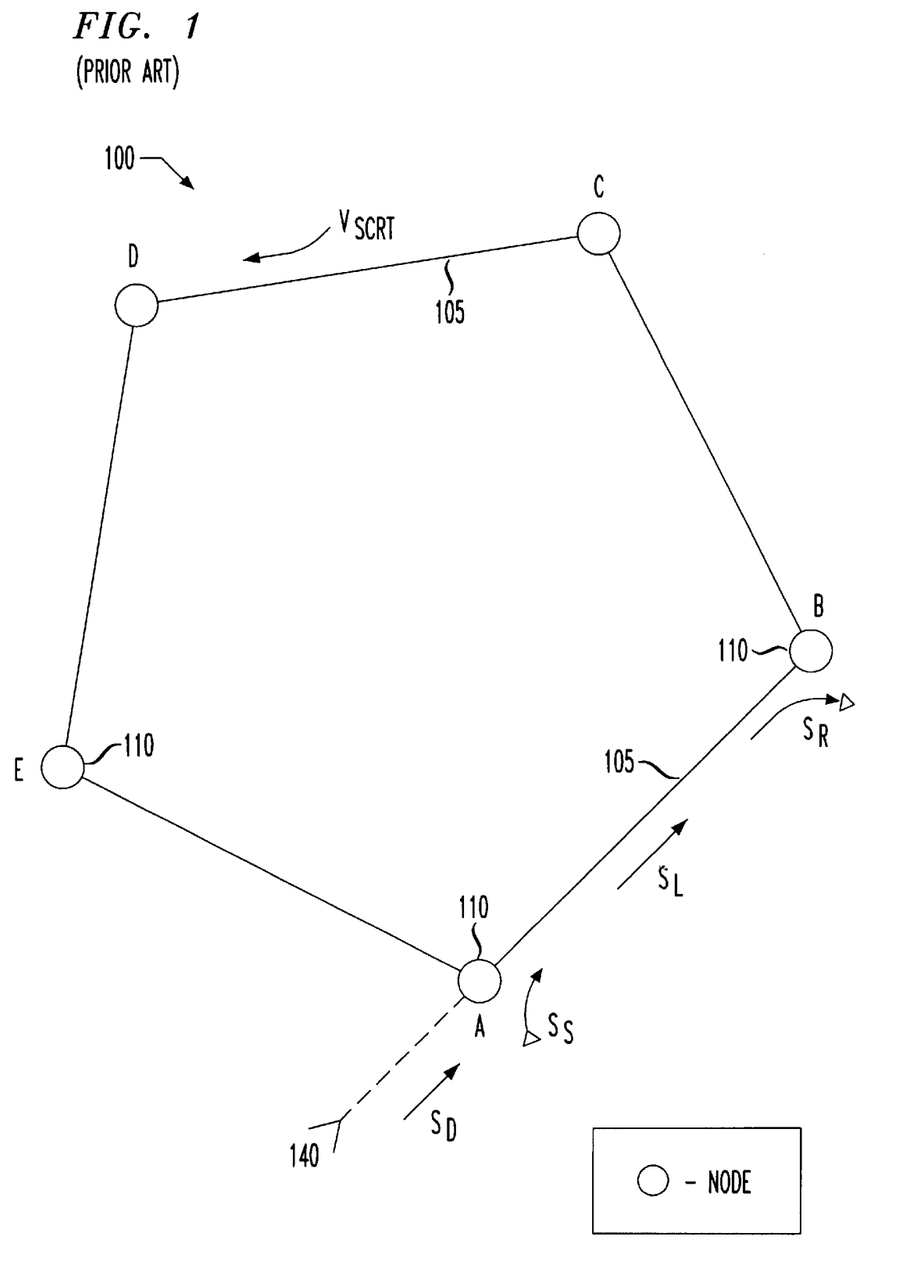
FIG. 1 illustrates a unidirectional ring network.

Referring now to the drawings, FIG. 1 shows a unidirectional ring network 100. The network 100 includes a plurality of links 105 for transmission of signals $S_L$ and a plurality of nodes 110 for sending signals $S_S$ through the links 105 and for receiving signals $S_R$ from the links 105. For purposes of illustration, the ring network 100 is shown as having 5 nodes 110 and 5 links 105, but a ring network 100 can have as few as 3 nodes and as many as practical.

Each node 110 has a unique address, for example A, B, C, D, or E. Each node 110 also has exactly two adjacent nodes 110. For example, nodes 110 with addresses A and C are adjacent to node 110 with address B. Each link 105 is disposed between adjacent nodes 110 and is for transmission of signals between those adjacent nodes 110 in a particular direction. For example, the link 105 disposed between nodes 110 with addresses A and B is for transmission of signals $S_L$ from node 110 with address A to node 110 with address B. Transmission of signals through all nodes is in the same direction, in this case, counterclockwise. Thus the network 100 is unidirectional.

The links 105 can be for transmission using any feasible medium of transmission. An exemplary link 105 is a fiber optic cable for transmission of optical signals $S_L$.

The nodes 110 and links 105 have the topology of a circle. Expressed in another manner, a signal $S_L$ transmitted from node 110 with address A to adjacent node 110 with address B can then be transmitted unambiguously to the other node 110 adjacent to node 110 with address B, in this case, node 110 with address C.

To continue with this example, the signal $S_L$ transmitted from node 110 with address B to node 110 with address C can then be transmitted unambiguously to the other node 110 adjacent to node 110 with address C, that is, node 110 with address D. The signal $S_L$ transmitted from node 110 with address C to node 110 with address D can then be transmitted unambiguously to the other node 110 adjacent to node 110 with address D, that is, node 110 with address E. The signal $S_L$ transmitted from node 110 with address D to node 110 with address E can then be transmitted to the other node 110 adjacent to node 110 with address E, that is, node 110 with address A. In other words, the signal $S_L$ transmitted from node 110 with address A returns to the same node 110 with address A.

Figure 2:
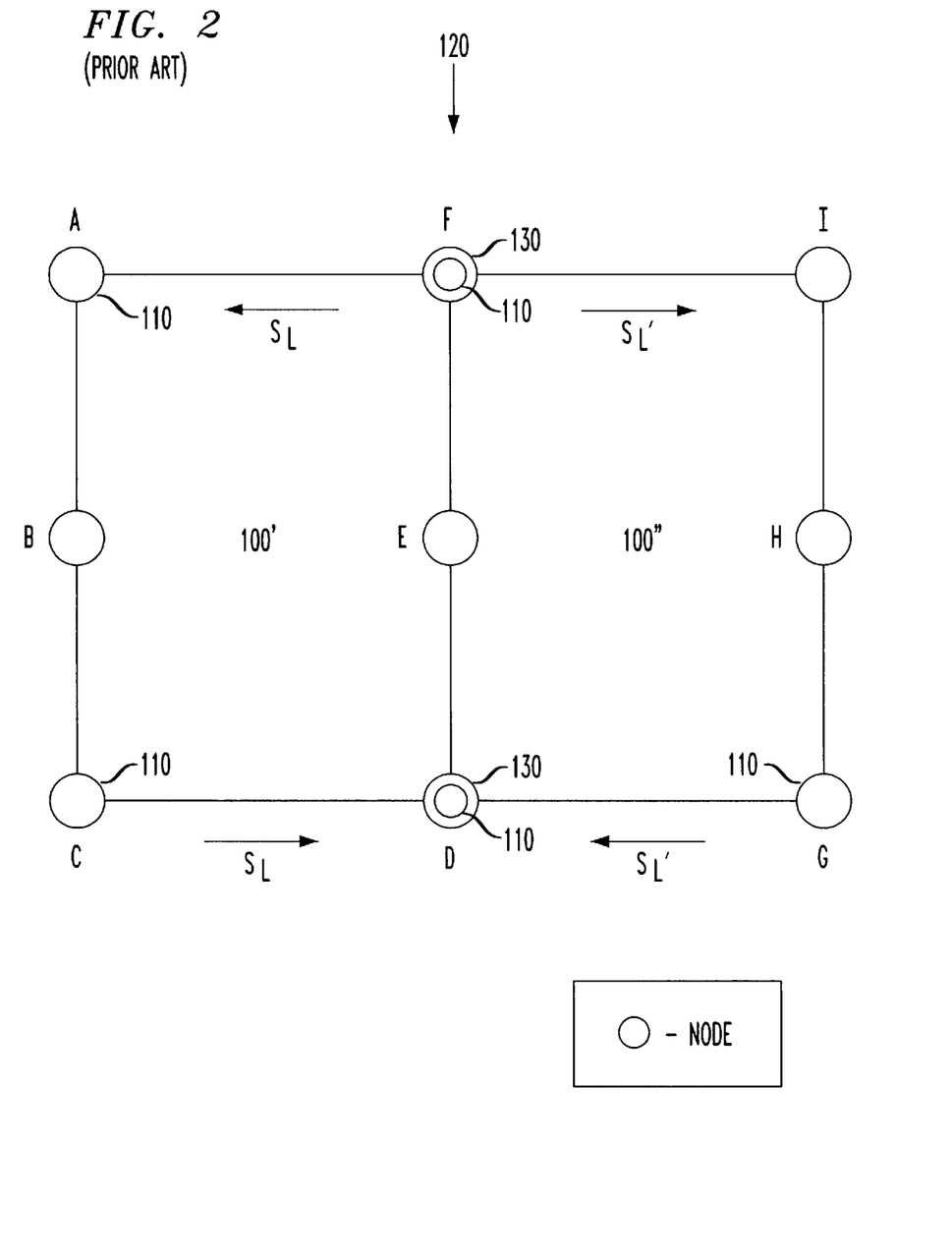
FIG. 2 illustrates a mesh network.

Referring now to FIG. 2, a mesh network 120 has 10 links 105 and 9 nodes 110, each node 110 having a unique address, such as A, B, C, D, E, F, G, H and I. This mesh network 120 differs from the ring network 100 of FIG. 1 in that nodes 110 with addresses D and F each have 3, rather than 2, adjacent nodes 110. The mesh network 120 is thus not a ring network.

Mesh network 120 can be considered as incorporating counterclockwise ring network 100' and clockwise ring network 100" with appropriate apparatus 130 at nodes 110 with addresses D and F for switching signals $S_L$ and $S_L'$ between ring networks 100' and 100". Thus, the present invention applies to mesh networks 120 and other types of networks incorporating ring networks 100 as well as to ring networks 100.

There are only two possible directions for the signal to travel in. The two directions will be referred to herein as a first direction and a second direction or as first parity and second parity.

Referring back to FIG. 1, a sending node 100, for example node 100 with address A, will send a signal $S_S$ to a receiving node 100, for example node 100 with address B, in response to a demand $S_D$. The source 140 of the demand $S_D$ is not relevant to this invention, but examples of such sources are computers, telecommunications equipment, and sensor apparatus. The most basic information that must be contained in the demand $S_D$ is the address of the sending node 110, the address of the receiving node 110, and the information to be passed from the sending node 110 to the receiving node 110. The addresses and information must be included in the transmitted signal $S_L$. The transmitted signal $S_L$ complies with a specified protocol (for example, specification of the size of a header, data section and trailer).

Each node 110 has the physical capability of being a sending node 110, and includes demand identification apparatus 142 (see, FIG. 5) capable of responding to a demand $S_D$ when acting as a sending node. A sending node 110 produces, in response to a demand $S_D$, a sending signal $S_S$ which includes the addresses and information in conformity with the specified protocol.

Each node 110 also has the physical capability of being a receiving node 110 and so, has receiving apparatus 144 (see, FIG. 5) responsive to each transmitted signal $S_L$ received at the node 110. The receiving apparatus 144 determines if the signal $S_L$ specifies that node 110 and, if so, receives the signal $S_R$ and removes the signal $S_L$ from the link 105.

In order for the network 100 to process more than one demand $S_D$ and transmit more than one signal $S_L$, it includes a mechanism for producing and distinguishing different signals. Examples of such mechanisms are time modulation, wavelength modulation, and frequency modulation. In an example of time modulation, each signal $S_L$ is of fixed duration and is known as a packet. Different demands $S_D$ result in nonoverlapping signals $S_L$ at different times so that different signals $S_L$ do not overlap or collide. In an example of wavelength modulation, signals are wavelength modulated on carriers, such as light, which have differing wavelengths.

In an exemplary embodiment, the links 105 are optical fibers, and each node 110 includes demand identification apparatus 142 (FIG. 5) for identifying the pair sending node 110 address and receiving node 110 address with a unique wavelength. The signal $S_S$ the sending node sends into the link 105 is modulated on a carrier of that wavelength. If the ring network 100 includes n nodes 110, then the number of possible ordered pairs of sending nodes and receiving nodes is n★(n−1). For example, the network 100 shown in FIG. 1 has 5 nodes and so it would have 20 different ordered pairs of sending nodes 110 and receiving nodes 110, and thus 20 different carrier wavelengths. These differing carrier wavelengths are considered differing channels. Thus, this exemplary network 100 must be capable of transmitting on any of 20 different wavelength channels. The actual channels might vary over time but, at any particular time, 20 carrier wavelengths are available for the demand identification apparatus 142 to transmit on.

To avoid misdirection of a signal, the nodes 110 of the network 100 use the same identification between ordered pairs of sending nodes 110 and receiving nodes 110 and channels. This information, referred to as channel identification apparatus 146 (see, FIG. 5), can be hardwired or broadcast to each node by a channel reference table signal $S_{CRT}$. The latter approach would provide more flexibility in adding and removing nodes 110.

As an example, on Table 1 each of the twenty pairs of sending nodes receiving nodes is identified with a channel.

TABLE 1

| Address of sending node 110 | Address of receiving node 110 | Channel |
| --- | --- | --- |
| A | B | 01 |
| A | C | 02 |
| A | D | 03 |
| A | E | 04 |
| B | A | 05 |
| B | C | 06 |
| B | D | 07 |
| B | E | 08 |
| C | A | 09 |
| C | B | 10 |
| C | D | 11 |
| C | E | 12 |
| D | A | 13 |
| D | B | 14 |
| D | C | 15 |
| D | E | 16 |
| E | A | 17 |
| E | B | 18 |
| E | C | 19 |
| E | D | 20 |

Figure 3:
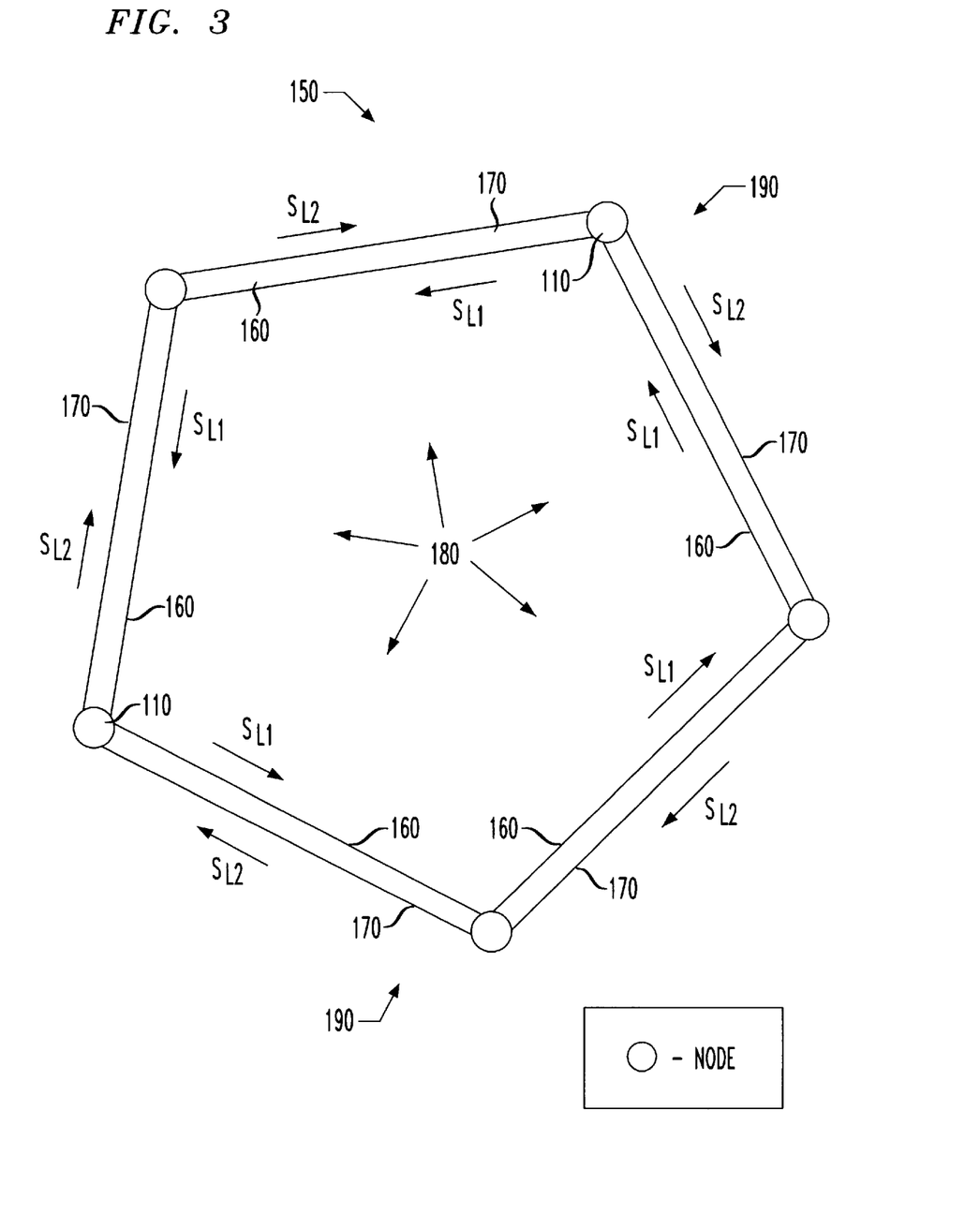
FIG. 3 illustrates a bi-directional ring network.

Referring now to FIG. 3, a bi-directional ring network 150 has two links 160 and 170, of first and second parity, respectively, between each pair of adjacent nodes 110. First parity links are for transmitting signals $S_{L1}$ in the direction as shown, and Second parity links are for transmitting signals $S_{L2}$ in the opposite direction as shown. Ignoring, for now, the second parity links 170, if all the first parity links 160 were operative, then the ring network 150 would have the same architecture as ring network 100. If such an apparatus had the same functional apparatus as ring network 100, then it would function as a ring network, and will be referred to herein as a first network 180. Similarly, ignoring, for now, the first parity links 160, if all the second parity links 170 were operative, then the ring network 150 would have the same architecture as ring network 100. If such an apparatus had the same functional apparatus as ring network 100, then it would function as a ring network, and will be referred to herein as a second network 190.

Figure 4:
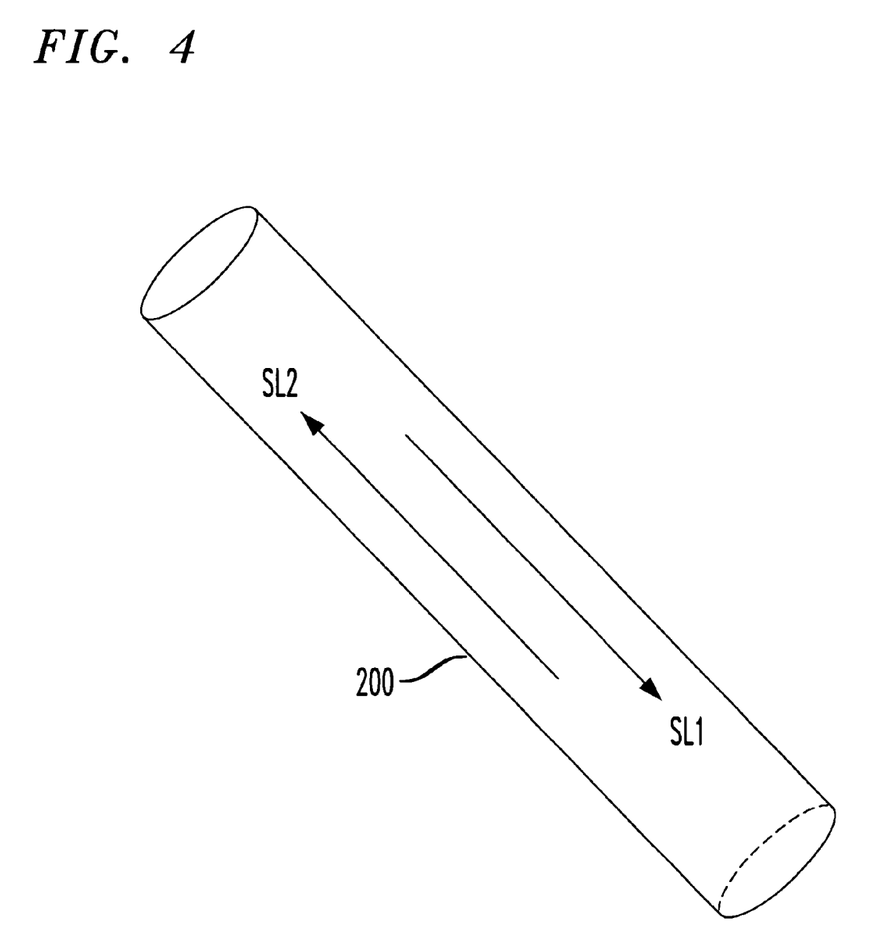
FIG. 4 shows a bi-directional link realized by an optical fiber having two links.

Links 105 are functionally defined as being for transmitting signals $S_L$ in a particular direction. Referring now to FIG. 4, a single structure, such as an optical fiber 200, could transmit signals $S_{L1}$ and $S_{L2}$, one in each direction, and thus include links 160 and 170 of opposite parity. Such a structure 200 is bi-directional.

Figure 5:
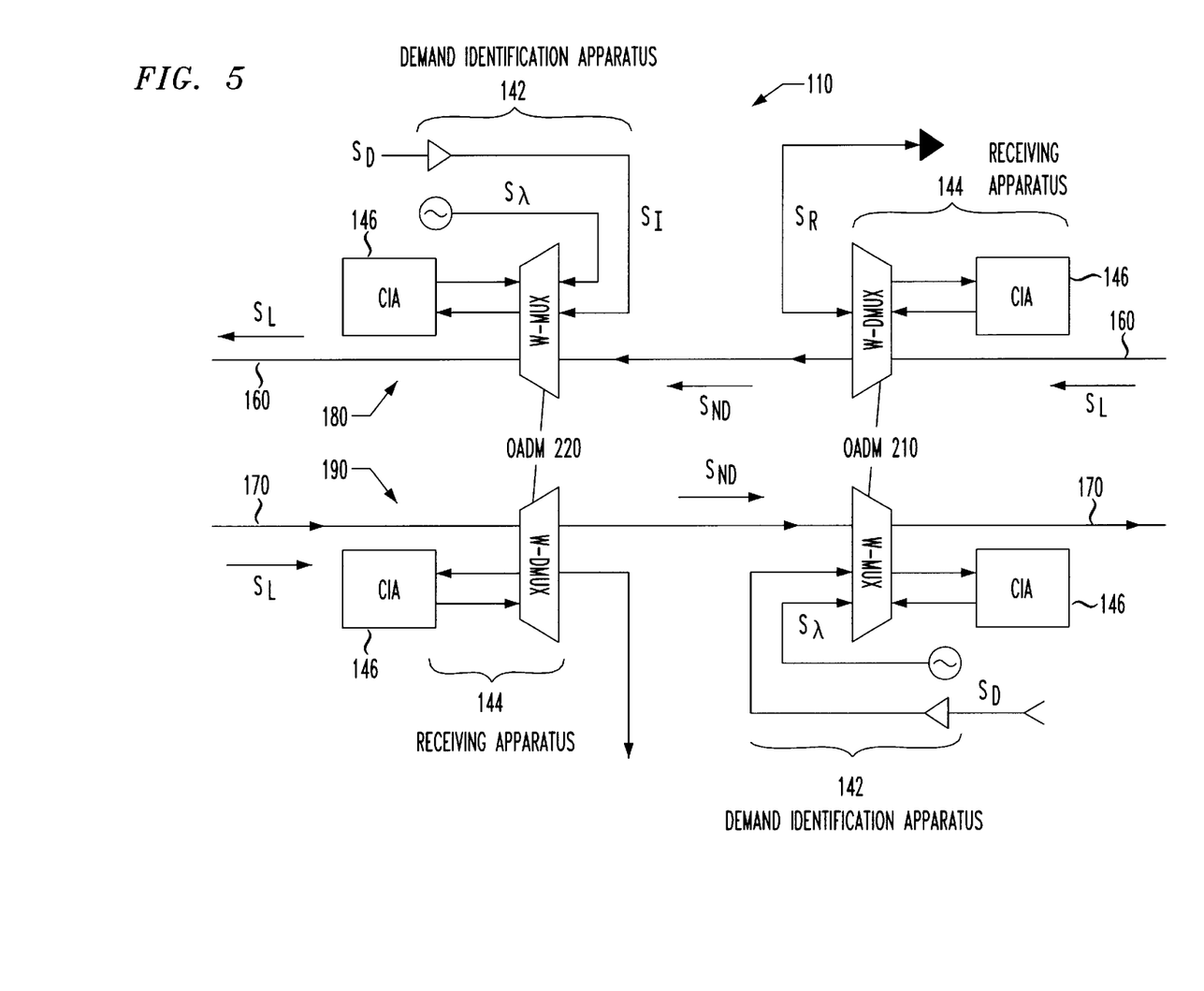
FIG. 5 illustrates a node connected to two bi-directional links.

Referring now to FIG. 5, a node 110 of a ring network 150 using wavelength modulation has as receiving apparatus 144 responsive to each transmitted signal $S_L$ received at the node 110, a wavelength demultiplexer in communication with a channel identification apparatus 146. Since ring network 150 has first direction links 160 and second direction links 170 for transmitting in opposite directions, node 110 has two such receiving apparatuses 144, one for each direction.

The demand identification apparatus 142 is downstream from the receiving apparatus 144. The stream of signals $S_{ND}$ which are not dropped by the receiving apparatus 144 reach the demand identification apparatus 142 and if a signal $S_S$ is added to the stream, the demand identification apparatus 142 does so. In response to a demand $S_D$, if node 110 is the sending node 110, the wavelength-multiplexer modulates the information $S_I$ contained in the demand $S_D$ with the appropriate wavelength carrier $S_\lambda$, in communication with the channel identification apparatus 146 to add a signal to the signal $S_{ND}$ so as to produce a signal $S_L$ leaving the node 110.

An exemplary optical node 110 includes a pair of optical add-drop mechanisms (hereinafter "OADM") 210 and 220, each of which includes a wavelength-demultiplexer and a wavelength-multiplexer. The first optical add-drop mechanism 210 is for dropping a signal $S_R$ from the first network 180 or adding a signal $S_S$ to the second network 190. The second optical add-drop mechanism 220 is for dropping a signal $S_R$ from the second network 190 or adding a signal $S_S$ to the first network 180.

Each channel is associated with either the first or second parity network 180 and 190. Such association is performed by the channel identification apparatus 146. As an example of such association, Table 2 defines an association in which odd channels are associated with the first parity network 180 and even channels are associated with the second parity network 190.

TABLE 2

| Address of sending node 110 | Address of receiving node 110 | Channel | Parity of Associated Network |
|---|---|---|---|
| A | B | 01 | first |
| A | C | 02 | second |
| A | D | 03 | first |
| A | E | 04 | second |
| B | A | 05 | first |

TABLE 2-continued

| Address of sending node 110 | Address of receiving node 110 | Channel | Parity of Associated Network |
|---|---|---|---|
| B | C | 06 | second |
| B | D | 07 | first |
| B | E | 08 | second |
| C | A | 09 | first |
| C | B | 10 | second |
| C | D | 11 | first |
| C | E | 12 | second |
| D | A | 13 | first |
| D | B | 14 | second |
| D | C | 15 | first |
| D | E | 16 | second |
| E | A | 17 | first |
| E | B | 18 | second |
| E | C | 19 | first |
| E | D | 20 | second |

As another example of such association, Table 3 defines an association in which all channels are associated with the first parity network 180 and no channels are associated with the second parity network 190.

TABLE 3

| Address of sending node 110 | Address of receiving node 110 | Channel | Parity of Associated Network |
|---|---|---|---|
| A | B | 01 | first |
| A | C | 02 | first |
| A | D | 03 | first |
| A | E | 04 | first |
| B | A | 05 | first |
| B | C | 06 | first |
| B | D | 07 | first |
| B | E | 08 | first |
| C | A | 09 | first |
| C | B | 10 | first |
| C | D | 11 | first |
| C | E | 12 | first |
| D | A | 13 | first |
| D | B | 14 | first |
| D | C | 15 | first |
| D | E | 16 | first |
| E | A | 17 | first |
| E | B | 18 | first |
| E | C | 19 | first |
| E | D | 20 | first |

A channel is referred to herein as having the same parity as the network with which it is associated. Thus, for the association defined in Table 2, odd channels are of first parity and even channels are of second parity. For the association defined in Table 3, all channels are of first parity and no channels are of second parity.

All such associations have in common the properties that the set of channels includes the two mutually exclusive sets of first parity channels and second parity channels and every channel is of either first or second parity.

The network, be it a first parity network 180 or a second parity network 190, with which a channel is associated, is referred to herein as the operative network. The other parity network is referred to herein as the backup network. For a channel of first parity, the operative network is the first parity network 180. The signal $S_S$ is added to the first parity network 180 at sending node 110, transmitted on first parity links 160 on the first parity network 180, and signal $S_R$ is received at the receiving node 110 from the first parity network 180. The second parity network 190, the backup network for this channel, is essentially inactive as far as this first parity channel is concerned. Similarly, for a channel of second parity, the operative network is the second parity network 190. The signal $S_S$ is added to the second parity network 190 at sending node 110, transmitted on second parity links 170 on the second parity network 190, and signal $S_R$ is received at the receiving node 110 from the second parity network 190. The first parity network 180, the backup network for this channel, is essentially inactive as far as this second parity channel is concerned.

Systems according to the principles of the invention are not limited to networks 150 with just two links between each pair of adjacent nodes 110. The same principles of this invention would apply equally well for networks with three, four, or more links between each pair of adjacent nodes 110.

Figure 6:
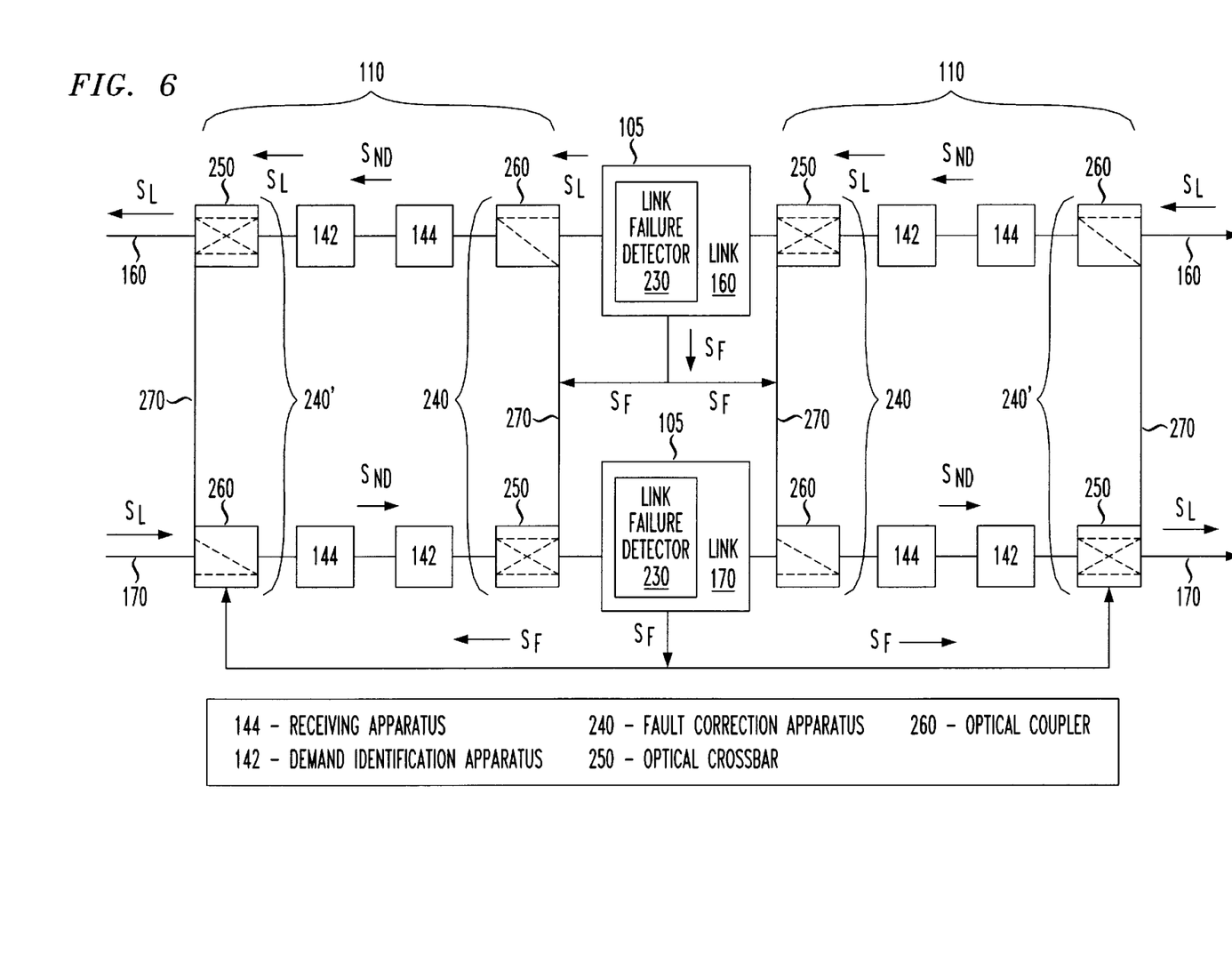
FIG. 6 illustrates fault correction apparatus.

Referring now to FIG. 6, fault recovery apparatus in the network 150 includes a link failure detector 230 in at least one link 160 or 170. In an embodiment of the present invention, every link 105 in the network 150 includes a link failure detector 230. The link failure detector 230 produces a link failure signal $S_F$ responsive to each signal $S_L$ that enters the link 105. For purposes of this discussion, only a link failure detector 230 in a first parity link 160 will be considered. It will be clear to a person of ordinary skill in the art how to extend the ideas of this invention to fault detection and recovery in a second parity link 170.

Each node 110 adjacent to the link 105 containing a link failure detector 230 has one failure correction apparatus 240 for each link failure detector 230. Thus, for the link failure detector 230 in first parity link 160, each adjacent node 110 has one failure correction apparatus 240. If the second parity link 170 also has a link failure detector 230, then each adjacent node 110 has one more failure correction apparatus 240'.

The link failure signal $S_F$ is produced by the link failure detector responsive to every signal $S_L$ that enters the link 105. The link failure signal $S_F$ detector is indicative of whether transmission of the signal $S_L$ through the link 105 is successful or not. The signal $S_F$ can be at its most basic a binary signal, that is, "yes" or "no". This signal $S_F$ is intended for transmittal to and use only by the fault correction apparatus 240 in the adjacent nodes 110. It is not intended that this signal $S_F$ be broadcast to any other node 110.

An exemplary fault correction apparatus 240 includes an optical crossbar 250, an optical coupler 260, and an interlink 270 for transmission from the optical crossbar 250 to the optical coupler 260.

Each fault correction apparatus 240 is logically disposed between the demand identification apparatus 142/receiving apparatus 144 pair and an adjacent link. In particular, the fault correction apparatus 240 associated with a link failure detector 230 on a first parity link 160 is between that first parity link 160 and the demand identification apparatus 142/receiving apparatus 144 pair. The fault correction apparatus 240 associated with a link failure detector 230 on a second parity link 170 is between an other second parity link 170 adjacent to the node 110 and the demand identification apparatus 142/receiving apparatus 144 pair. The fault correction apparatus 240 does not act on signals $S_{ND}$, but rather on signals $S_L$ before or after they have been processed by the demand identification apparatus 142/receiving apparatus 144 pair.

Figure 7:
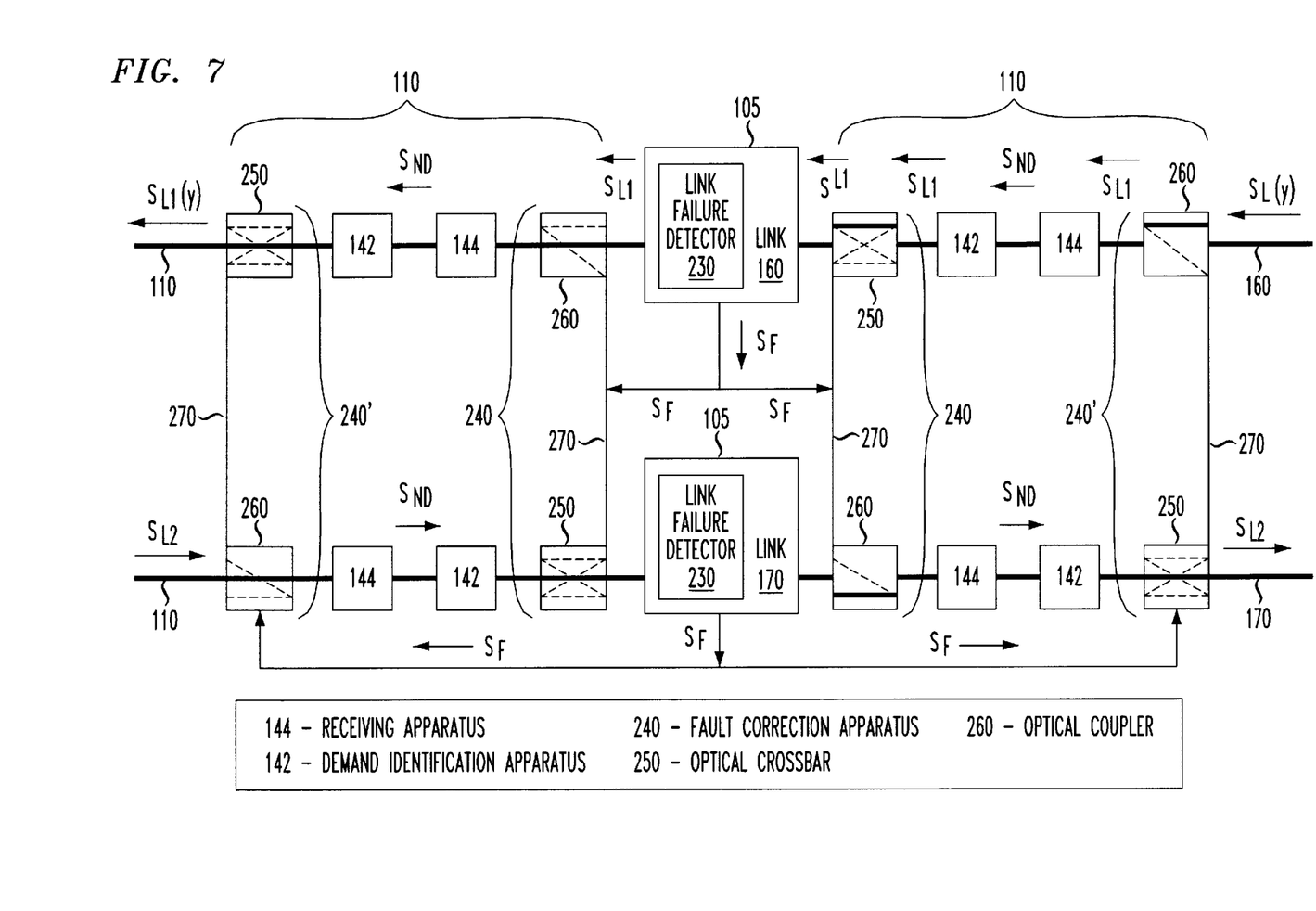
FIG. 7 shows the operation of fault correction apparatus after successful transmission.

The principles of operation of the fault recovery apparatus 230–240 will be discussed first for an operational link 160. Referring now to FIG. 7, the initial state for the crossbar 250 is transmission through. A signal on $S_{L1}$ channel x on the first parity network 180 which enters link 160 is successfully transmitted therethrough. In response to this successful transmission, the link failure detector 230 generates a signal $S_F$ indicative of success and, upon receipt of this signal $S_F$, the crossbar 250 in the failure correction apparatus 240 remains in the transmission through state. Assuming that the link 160 is operational on channel y of the first parity, subsequent signals $S_{L1}$ on channel y on the first parity network 180 from sending node 110 to receiving node 110 with addresses A and B are transmitted as shown by thick lines in FIGS. 8 and 9, and subsequent signals $S_{L2}$ on the second parity network 190 from sending node 110 to receiving node 110 with addresses D and C, respectively, are transmitted as shown by thick lines in FIGS. 8 and 9.

Figure 9:
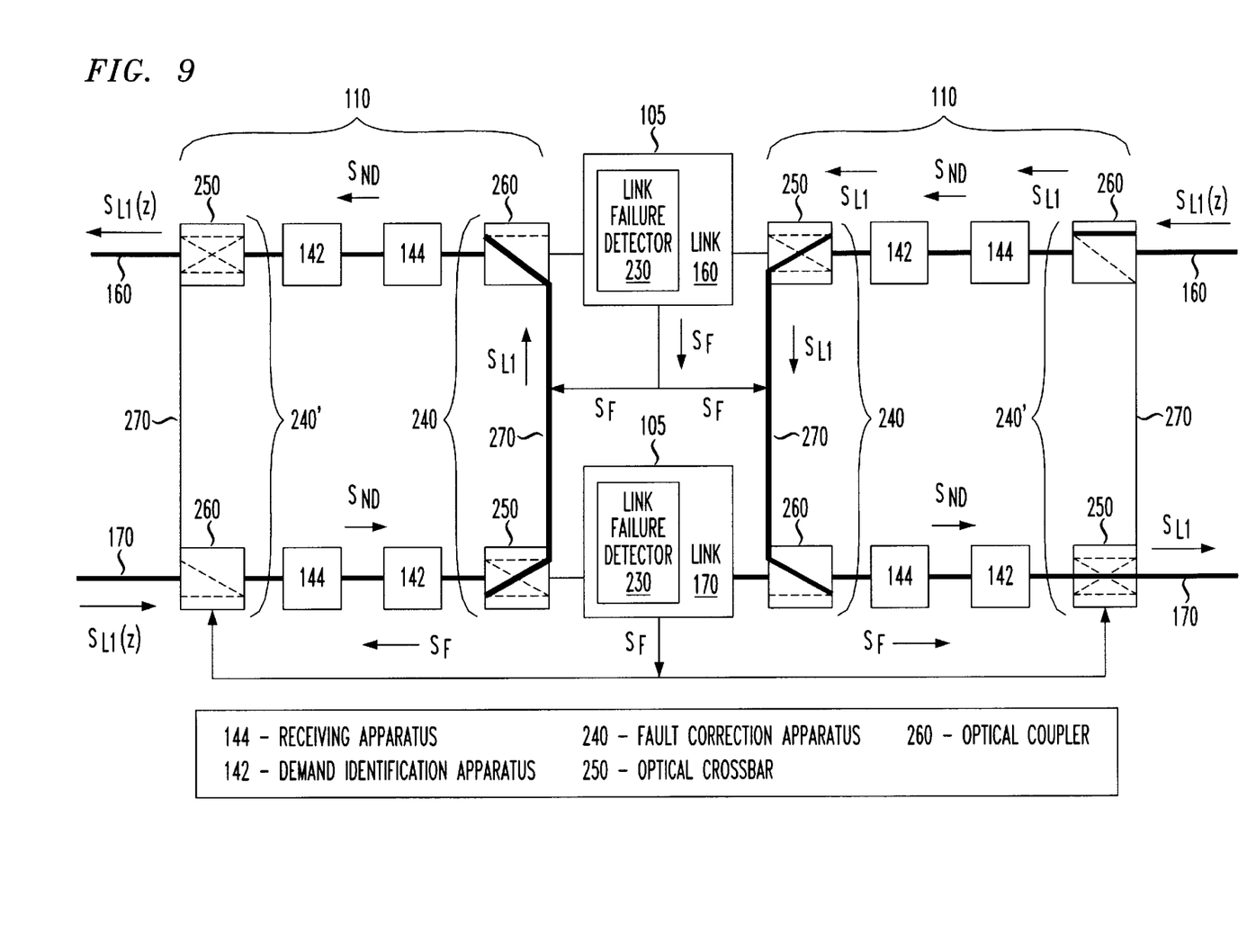
FIG. 9 shows the operation of fault correction apparatus after unsuccessful transmission.

If, on the other hand, link 160 ceases to be operational for channel y of first parity, then signal $S_{L1}$ on the first parity network 180, which enters link 160, is not successfully transmitted therethrough. Referring now to FIG. 9, in response to this failure, the link failure detector 230 generates a signal $S_F$ indicative of failure and, upon receipt of this signal $S_F$, crossbar 250 in failure correction apparatus 240 switches to the cross-state. The crossbar 250 remains in this state until it is reset to the transmission through state. It is to be noted that the signal $S_{L1}$ which was not successfully transmitted through link 160 does not reach its intended receiving node 110.

Figure 8:
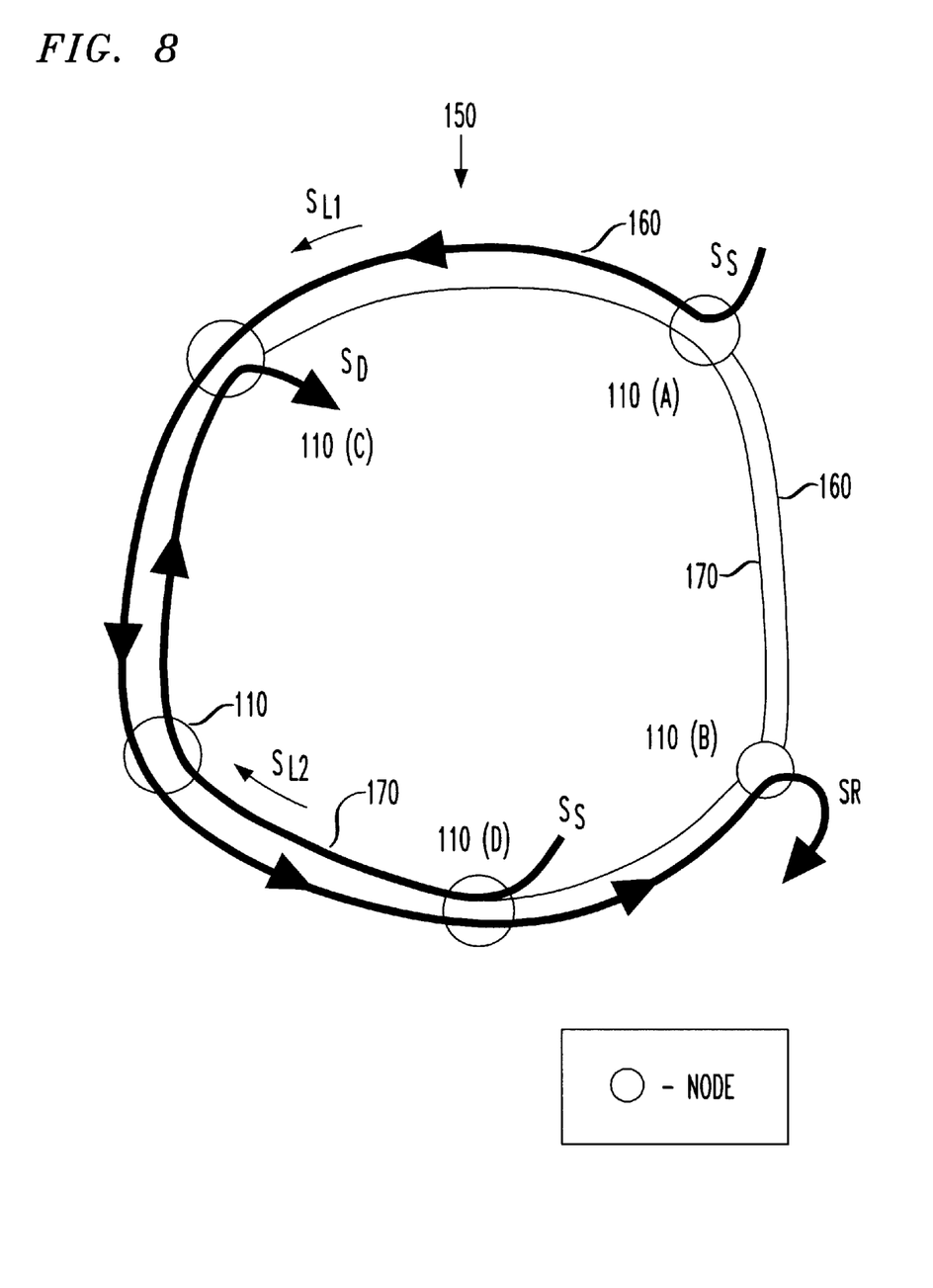
FIG. 8 shows the transmission signals in a network after fault correction apparatus has detected successful transmission of a previous signal.

After such a failure, link 160 which failed in its transmission of signal $S_{L1}$ is referred to as a "break" 280. As above, it is appropriate to consider a subsequent signal $S_{L1}$ on channel z on the first parity network 180 from sending node 110 to receiving node 110 with addresses A and B. If the path on the first parity network 180 from nodes 110 with addresses A and B does not cross the break 280, for example, if the break 280 is on the link 160 between nodes 110 with addresses B and A, then the signal $S_{L1}$ is transmitted as shown in FIG. 8. It is also appropriate to consider a subsequent signal $S_{L2}$ on the second parity network 190 from sending node 110 to receiving node 110 with addresses D and C, respectively. If the path on the second parity network 190 from nodes 110 with addresses D to C does not cross the break 280, for example, if the break 280 is on the link 170 between nodes 110 with addresses D and C, then the signal $S_{L2}$ is transmitted as shown in FIG. 8.

Figure 10:
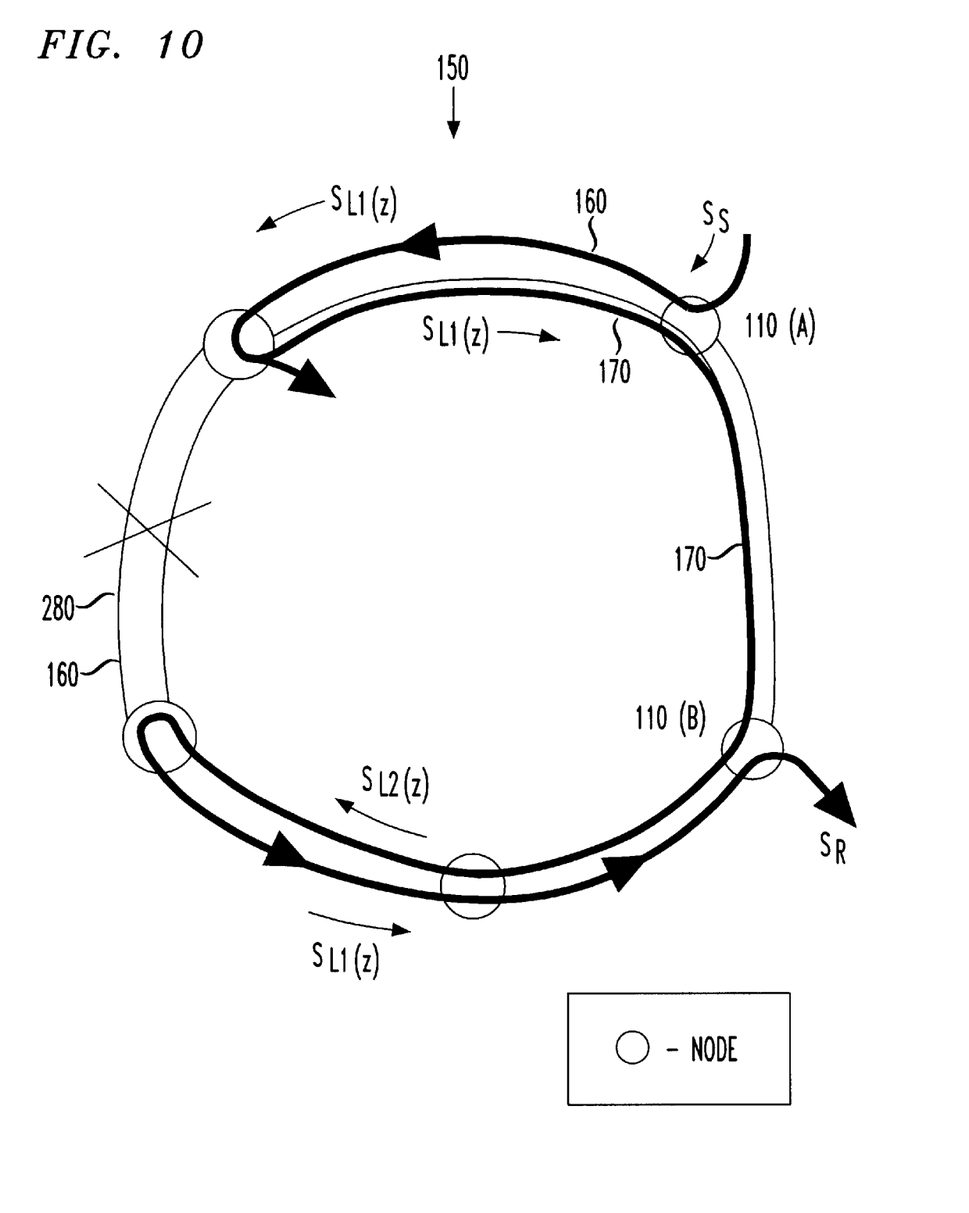
FIG. 10 shows the transmission signals in a network after fault correction apparatus has detected unsuccessful transmission of a previous signal.

Referring now to FIGS. 9 and 10, the state for the crossbar 250 is crossover. If the path on the first parity network 180 from nodes 110 with addresses A and B does cross the break 280, then subsequent signals $S_{L1}$ on channel z on the first parity network 180 from sending node 110 to receiving node 110 with addresses A and B are transmitted as shown by thick lines in FIGS. 9 and 10. Upon reaching the optical crossbar 250 in the failure correction apparatus 240 of the node 110 just before the break 280, the signal $S_{L1}$ is crossed over and directed to the interlink 270 for transmission from the optical crossbar 250 to the optical coupler 260. Upon reaching the optical coupler 260, the signal $S_L1$ is brought into the stream of signals in the second network 190, the protection network for signal $S_{L1}$ of channel z. The signal is then transmitted around the second network 190 until it reaches the optical crossbar 250 in the failure correction apparatus 240 of the node 110 just before the break 280, the signal $S_{L1}$ is crossed over and directed to the interlink 270 for transmission from the optical crossbar 250 to the optical coupler 260. Upon reaching the optical crossbar 250 in the failure correction apparatus 240 of the node 110 just before the break 280, the signal $S_{L1}$ is crossed over and directed to the interlink 270 for transmission from the optical crossbar 250 to the optical coupler 260. Upon reaching the optical coupler 260, the signal $S_{L1}$ is brought into the stream of signals in the first network 180, the working network for signal $S_{L1}$ of channel z. The signal $S_{L1}$ then continues on the first network 180 until it reaches the receiving node 110 with address B, at which point it is dropped.

Figure 11:
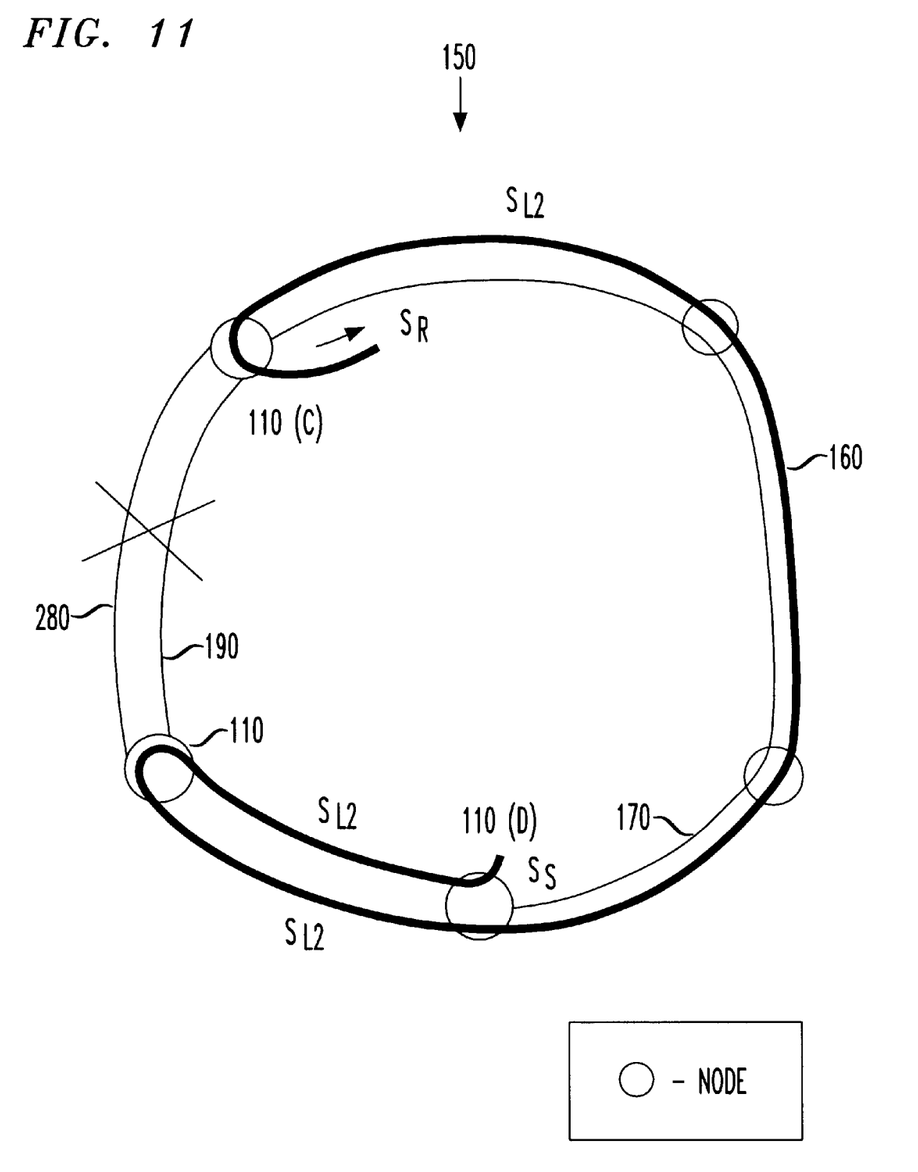
FIG. 11 shows the transmission signals in a network after fault correction apparatus has detected unsuccessful transmission of a previous signal.

If the path on the second parity network 190 from nodes 110 with addresses D to C does cross the break 280, then the signal $S_{L2}$ from nodes 110 with addresses D to C is transmitted as shown in FIG. 11. The signal is looped back in the opposite direction on the other node twice, just as the signal $S_{L1}$ is. In fact, the two signals $S_{L1}$ and $S_{L2}$ might overlap over some links 105.

Referring back to FIG. 6, the effect of a failure detector 230 in second parity link 170 and failure correction apparatus 240' in adjacent nodes 110 is very similar to the effect of a failure detector 230 in first parity link 160 and failure correction apparatus 240 in adjacent nodes 110, and will not be described in further detail.

The effect of the failure detector 230 and failure correction apparatus 240 in responding to a break is to permit all signals to travel over both first and second networks 180 and 190 and convert the double loop architecture of network 150 into a single loop architecture.

The foregoing descriptions of the exemplary embodiments are intended to be illustrative and not limiting. It will be appreciated that numerous modifications and variations can be made without departing from the spirit or scope of the present invention.

What is claimed is:

1. A network comprising:

(a) a plurality of nodes wherein each node is adjacent to exactly two other nodes, each of said nodes having an address unique among said plurality of nodes, and each of said nodes being capable of being a sending node or a receiving node for some demand;

(b) a first-parity and a second-parity fiber link disposed between each pair of adjacent nodes, said first-parity link being for transmitting between the pair of adjacent nodes in a first direction signals conforming to a specified protocol, said second-parity link being for transmitting between the pair of adjacent nodes in a second direction opposite to the first direction signals conforming to the protocol, so that the collection of said first-parity fibers and said nodes adjacent to said first-parity fibers constitutes a first network for transmitting in the first direction signals conforming to the protocol, so that the collection of said second-parity fibers and said nodes adjacent to said second-parity fibers constitutes a second network for transmitting in the second direction signals conforming to the protocol, wherein at least all but one of the pairs of adjacent nodes has a fully functional pair of first- and second-parity fiber links disposed therebetween;

(c) demand identification means responsive to a demand for transmission of information from a sending node to a receiving node for identifying the demand with a channel so that the channel unambiguously identifies the sending node address and the receiving node address, the channel being classified as either first- or second-parity, first- and second parity being mutually exclusive classifications;

(d) sending means responsible to the demand, said sending means being disposed at the sending node, for encoding the information and the channel produced by said demand identification means to produce a signal conforming to the protocol, for transmitting the signal into the first network if the channel is of first-parity, and for transmitting the signal into the second network if the channel is of second-parity;

(e) receiving means disposed at each of said plurality of nodes, said receiving means being responsive to each signal in the first and second network arriving at the node, for detecting the arrived signal, decoding the channel produced by said demand identification means encoded in the signal produced by said sending means to determine whether the receiving node specified by the channel is the node where the signal arrived and if so, dropping the arrived signal by further decoding the arrived signal to identify the address of the sending node and to extract the information contained in the arrived signal;

(f) a link failure detector in at least one of said links for detecting whether transmission of a signal conforming to the protocol and intended for transmission between the pair of nodes adjacent to a link of the at least one of said links was successful or unsuccessful, and for producing a link transmission signal indicative of such success or lack of success, the link transmission signal being intended for transmission to the pair of adjacent nodes; and (g) a failure correction apparatus in each node adjacent to a link having said link failure detector, said failure correction apparatus being responsive to the link transmission signal produced by said failure correction apparatus, so that in response to a link transmission signal indicative of unsuccessful transmission, any signal in said first or second network arriving subsequently at said node is diverted to said network of the other parity, and so that in response to a link transmission signal indicative of successful transmission, any signal in said first or second network arriving subsequently at said node is permitted to continue in the same network in which it arrived, any signal subsequently produced by said sending means at said node for transmission into said first or second network being treated as a signal in the same network arriving subsequently at said node.

2. The network of claim 1, wherein the signal is a WDM signal.

3. The network of claim 1, wherein the fault detector is adapted to detect a failure of at least one said link to convey a signal through a wavelength channel.

* * * * *